US005212008A

United States Patent [19]

Malhotra et al.

[11] Patent Number: 5,212,008

[45] Date of Patent: May 18, 1993

[54] COATED RECORDING SHEETS

[75] Inventors: Shadi L. Malhotra; Josephine P. Turner, both of Mississauga; Brent S. Bryant, Ontario; Arthur Y. Jones, Mississauga, all of Canada

[73] Assignee: Xerox Corporation, Stamford, Conn.

[21] Appl. No.: 861,668

[22] Filed: Apr. 1, 1992

[51] Int. Cl.[5] .................... B41M 5/00; B32B 27/08

[52] U.S. Cl. .................... 428/216; 428/195; 428/330; 428/331; 428/412; 428/419; 428/498; 428/500; 428/507; 428/518; 428/520; 428/521; 428/522; 428/910; 428/480; 428/473.5; 346/135.1; 427/261

[58] Field of Search .............. 428/195, 216, 412, 330, 428/331, 480, 419, 498, 500, 518, 507, 521, 520, 522, 910, 473.5

[56] References Cited

U.S. PATENT DOCUMENTS

| | | | |
|---|---|---|---|
| 3,622,320 | 11/1971 | Allen | 96/28 |
| 4,547,405 | 10/1985 | Bedell et al. | 427/256 |
| 4,575,465 | 3/1986 | Viola | 427/261 |
| 4,701,837 | 10/1987 | Sakaki et al. | 346/135.1 |
| 4,775,594 | 10/1988 | Desjarlais | 428/421 |
| 4,781,985 | 11/1988 | Desjarlais | 428/421 |
| 4,869,955 | 9/1989 | Ashcraft et al. | 428/327 |
| 4,877,680 | 10/1989 | Sakaki et al. | 428/332 |
| 4,997,697 | 3/1991 | Malhotra | 428/480 X |
| 5,068,140 | 11/1991 | Malhotra et al. | 428/476.3 |

*Primary Examiner*—P. C. Sluby
*Attorney, Agent, or Firm*—Judith L. Byorick

[57] ABSTRACT

Disclosed is a recording sheet which comprises a substrate; a first coating in contact with the substrate which comprises a crosslinking agent selected from the group consisting of hexamethoxymethyl melamine, methylated melamine-formaldehyde, methylated urea-formaldehyde, cationic urea-formaldehyde, cationic polyamine-epichlorohydrin, glyoxal-urea resin, poly (aziridine), poly (acrylamide), poly (N,N-dimethyl acrylamide), acrylamide-acrylic acid copolymer, poly (2-acrylamido-2-methyl propane sulfonic acid), poly (N,N-dimethyl-3,5-dimethylene piperidinium chloride), poly (methylene-guanidine) hydrochloride, poly (ethylene imine) poly (ethylene imine) epichlorohydrin, poly (ethylene imine) ethoxylated, glutaraldehyde, and mixtures thereof; a catalyst; and a polymeric material capable of being crosslinked by the crosslinking agent and selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof; and a second coating in contact with the first coating which comprises a binder and a material selected from the group consisting of fatty imidazolines, ethosulfate quaternary compounds, dialkyl dimethyl methosulfate quaternary compounds, alkoxylated di-fatty quaternary compounds, amine oxides, amine ethoxylates, Imidazoline quaternary compounds, alkyl benzyl dimethyl quaternary compounds, poly (epiamines), and mixtures thereof.

18 Claims, No Drawings

COATED RECORDING SHEETS

BACKGROUND OF THE INVENTION

The present invention is directed to recording sheets, such as transparency materials, filled plastics, and the like, suitable for use in copying and printing applications. More specifically, the present invention is directed to recording sheets suitable for use in both ink jet and electrophotographic imaging processes. One embodiment of the present invention is directed to a recording sheet which comprises a substrate; a first coating in contact with the substrate which comprises a crosslinking agent selected from the group consisting of hexamethoxymethyl melamine, methylated melamine-formaldehyde, methylated urea-formaldehyde, cationic urea-formaldehyde, cationic polyamineepichlorohydrin, glyoxal-urea resin, poly (aziridine), poly (acrylamide), poly (N,N-dimethyl acrylamide), acrylamide-acrylic acid copolymer, poly (2-acrylamido-2-methyl propane sulfonic acid), poly (N,N-dimethyl-3,5-dimethylene piperidinium chloride), poly (methylene-guanidine) hydrochloride, poly (ethylene imine) poly (ethylene imine) epichlorohydrin, poly (ethylene imine) ethoxylated, glutaraldehyde, and mixtures thereof; a catalyst; and a polymeric material capable of being crosslinked by the crosslinking agent and selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof; and a second coating in contact with the first coating which comprises a binder and a material selected from the group consisting of fatty imidazolines, ethosulfate quaternary compounds, dialkyl dimethyl methosulfate quaternary compounds, alkoxylated di-fatty quaternary compounds, amine oxides, amine ethoxylates, Imidazoline quaternary compounds, alkyl benzyl dimethyl quaternary compounds, poly (epiamines), and mixtures thereof.

U.S. Pat. No. 4,775,594 (Desjarlais) discloses an ink jet transparency which exhibits improved wetting properties, thereby resulting in an even surface distribution of ink on the transparency. The transparency comprises a substantially transparent resinous support (such as a polyester film) and a substantially clear coating thereon which includes a non-volatile organic acid. Examples of preferred non-volatile organic acids include glycolic acid, citric acid, malonic acid, tartaric acid, maleic acid, fumaric acid, malic acid, and succinic acid. The presence of the organic acid results in improved wetting of the ink in solid block areas, preventing the ink from coalescing onto itself. Undesired voids and pin holes in those areas where the ink has been applied are therefore avoided.

U.S. Pat. No. 4,781,985 (Desjarlais) discloses an ink jet transparency which exhibits the ability to maintain the edge acuity of ink patterns or blocks on the transparency. The transparency comprises a substantially transparent resinous support (such as a polyester film) and a substantially clear coating thereon which includes a specific fluorosurfactant. The presence of the fluorosurfactant in the clear coating prevents trailing of the ink. As a result, patterns and ink blocks do not trail into one another on the transparency and maintain their defined shape and size.

U.S. Pat. No. 3,622,320 (Allen) discloses photocrosslinkable polyesters prepared with 50 mole percent of at least one diol moiety and 50 mole percent of at least two hydroxy-free dicarboxylic acid moieties, about 5 to 45 mole percent, based on the polyester, of the dicarboxylic acid moieties containing a light sensitive grouping. The polyesters are useful in a wide variety of photothermographic elements.

U.S. Pat. No. 4,547,405 (Bedell et al.) discloses an ink jet recording sheet comprising a transparent support carrying a layer comprising 5 to 100 percent by weight of a coalesced block copolymer latex of polyvinyl alcohol with polyvinyl (benzyl ammonium chloride) and 0 to 95 percent by weight of a water soluble polymer selected from the group consisting of polyvinyl alcohol, polyvinyl pyrrolidone, and copolymers thereof.

U.S. Pat. No. 4,575,465 (Viola) discloses an ink jet recording sheet coprising a transparent support carrying a layer comprising up to 50 percent by weight of a vinylpyridine/vinylbenzyl quaternary salt copolymer and a hydrophilic polymer selected from the group consisting of gelatin, polyvinyl alcohol, and hydroxypropyl cellulose and mixtures thereof.

U.S. Pat. No. 4,869,955 (Ashcraft et al.) discloses an element suitable for preparing transparencies using an electrostatic plain paper copier. The element comprises a polyethylene terephthalate support (polyester), at least one subbing layer coated thereon, and coated to the subbing layer a toner receptive layer comprising a mixture of an acrylate binder, a polymeric antistatic agent having carboxylic acid groups, a crosslinking agent, butylmethacrylate modified polymethacrylate beads, and submicron beads.

U.S. Pat. No. 4,701,837 (Sakaki et al), the disclosure of which is totally incorporated herein by reference, discloses a light-transmissive recording medium which has an ink receiving layer formed mainly of a water soluble polymer and a crosslinking agent on a light transmissive substrate, wherein the polymer constituting said ink receiving layer has a crosslinking degree within the range of from the crosslinking degree satisfying the water resistance of the ink receiving layer in to the crosslinking degree giving the ink receiving capacity of 0.2 $\mu l/cm^2$ in the ink receiving layer. A recording method employing the above mentioned recording medium is also provided.

U.S. Pat. No. 4,877,680 (Sakaki et al.) discloses a recording medium comprising a substrate and a nonporous ink receiving layer. The ink receiving layer contains a water-insoluble polymer containing a cationic resin. The recording medium may be employed for recording by attaching droplets of a recording liquid thereon.

While known compositions and processes are suitable for their intended purposes, a ned remains for improved recording sheets. In addition, there is a need for improved recording sheets suitable for use in ink jet printing processes. Further, a need remains for improved recording sheets suitable for use in printing and copying processes employing electrophotographic-type developers. Additionally, a need exists for recording sheets that enable the formation of images with high optical density. There is also a need for recording sheets that enable the formation of high quality color images with minimum intercolor bleed. In addition, there is a need for recording sheets that exhibit minimum intercolor bleed of color images when the imaged sheets are stored in folders or plastic sleeves. Further, a need remains for recording sheets that exhibit excellent heat and/or humidity resistance. Additionally, there is a need for recording sheets that exhibit minimum blocking (sticking together) at high relative humidities of, for example, 50 to 80 percent and at relatively high temperatures of, for example, over 50° C.

SUMMARY OF THE INVENTION

It is an object of the present invention to provide recording sheets with the above noted advantages.

It is another object of the present invention to provide recording sheets suitable for use in ink jet printing processes.

It is yet another object of the present invention to provide recording sheets suitable for use in printing and copying processes employing electrophotographic-type developers.

It is still another object of the present invention to provide recording sheets that enable the formation of images with high optical density.

Another object of the present invention is to provide recording sheets that enable the formation of high quality color images with minimum intercolor bleed.

Yet another object of the present invention is to provide recording sheets that exhibit minimum intercolor bleed of color images when the imaged sheets are stored in folders or plastic sleeves.

Still another object of the present invention is to provide recording sheets that exhibit excellent heat and/or humidity resistance.

It is another object of the present invention to provide recording sheets that exhibit minimum blocking (sticking together) at high relative humidities of, for example, 50 to 80 percent and at relatively high temperatures of, for example, over 50° C.

These and other objects of the present invention (or specific embodiments thereof) can be achieved by providing a recording sheet which comprises a substrate; a first coating in contact with the substrate which comprises a crosslinking agent selected from the group consisting of hexamethoxymethyl melamine, methylated melamine-formaldehyde, methylated urea-formaldehyde, cationic urea-formaldehyde, cationic polyamine-epichlorohydrin, glyoxal-urea resin, poly (aziridine), poly (acrylamide), poly (N,N-dimethyl acrylamide), acrylamide-acrylic acid copolymer, poly (2-acrylamido-2-methyl propane sulfonic acid), poly (N,N-dimethyl-3,5-dimethylene piperidinium chloride), poly (methylene-guanidine) hydrochloride, poly (ethylene imine), poly (ethylene imine) epichlorohydrin, poly (ethylene imine) ethoxylated, glutaraldehyde, and mixtures thereof; a catalyst; and a polymeric material capable of being crosslinked by the crosslinking agent and selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof; and a second coating in contact with the first coating which comprises a binder and a material selected from the group consisting of fatty imidazolines, ethosulfate quaternary compounds, dialkyl dimethyl methosulfate quaternary compounds, alkoxylated difatty quaternary compounds, amine oxides, amine ethoxylates, Imidazoline quaternary compounds, alkyl benzyl dimethyl quaternary compounds, poly (epiamines), and mixtures thereof.

DETAILED DESCRIPTION OF THE INVENTION

The recording sheets of the present invention comprise a substrate and at least two coating layers on one or both surfaces of the substrate. Any suitable substrate can be employed. Examples include transparent materials, such as polyester, including Mylar TM, available from E.I. Du Pont de Nemours & Company, Melinex TM, available from Imperial Chemicals, Inc. Celanar TM, available from Celanese Corporation, polycarbonates such as Lexan TM, available from General Electric Company, polysulfones, such as those available from Union Carbide Corporation, polyethersulfones, such as those prepared from 4,4'-diphenyl ether, such as Udel TM, available from Union Carbide Corporation, those prepared from disulfonyl chloride, such as Victrex TM, available from ICI America Incorporated, these prepared from biphenylene, such as Astrel TM, available from 3M Company, poly (arylene sulfones), such as those prepared from crosslinked poly(arylene ether ketone sulfones), cellulose triacetate, polyvinylchloride cellophane, polyvinyl fluoride, polyimides, and the like, with polyester such as Mylar TM being preferred in view of its availability and relatively low cost. The substrate can also be opaque, including opaque plastics, such as Teslin TM, available from PPG Industries, and filled polymers, such as Melinex ®, available from ICI. Other substrates, such as paper, can also be used if desired, although transparency materials and opaque plastics are preferred. The substrate can be of any effective thickness. Typical thicknesses for the substrate are from about 50 to about 250 microns, and preferably from about 100 to about 125 microns, although the thickness can be outside of these ranges.

The first coating is in contact with the substrate and comprises a crosslinking agent, a catalyst, and a polymeric material capable of being crosslinked by the crosslinking agent. The crosslinking agent is a material that crosslinks the polymeric material either chemically, by way of covalent bonding, or physically, by way of the formation of a complex. Examples of suitable crosslinking agents include hexamethoxymethylmelamine, such as Cymel 303, available from American Cyanamid Company, methylated melamines, such as Resimene 2040, available from Monsanto Chemical Company, partially methylated melamine-formaldehyde, such as Cymel 373, available from American Cyanamid Company, methylated urea-formaldehyde, such as Beetle 65, available from American Cyanamid Company, butylated urea-formaldehydes, such as Resimene 920, available from Monsanto Chemical Company, poly (vinyl Amines), such as #1562, available from Poly Sciences Inc., cationic urea-formaldehyde resins, such as Resin 917, available from Hercules Chemical Company, and Poly Cup 917 resin available from Hercules Chemical Company, glutaraldehydes, such as those available from Aldrich Chemical Company, glyoxal-urea resins, such as Nopcote 1670, and Nopcote 1661, available from Henkel Corporation, dimethylaminomethyl phenols, such as DMP-10, available from Rohm and Haas, Inc., cationic polyamide-epichlorohydrins, such as the Kymene resins available from Hercules Chemical Company, oxazolidines, such as Zoldine ZT55, available from Angus Chemical Company, poly (aziridines), such as Xama 7, available from Hoechst Celanese Company, acrylamide polymers, such as poly (acrylamide) (such as #02806, available from Poly Sciences Inc.), acrylamide-acrylic acid copolymers, such as #04652, #02220, and #18545, available from Poly Sciences Inc., poly (N,N-dimethylacrylamide), such as #004590, available from Poly Sciences Inc., poly (2-acrylamido-2-methyl propane sulfonic acid), such as #401, available from Scientific Polymer Products, chlorinated polymers, such as poly (methylene-guanidine) hydrochloride (such as #654, available from Scientific Polymer Products), poly (N,N-dimethyl-3,5 dimethylene piperidinium chloride), such as #175, available from Scientific Polymer Products, ethylene imine containing polymers, such as poly (ethylene imine) (such as #135, available from Scientific Polymer Products), poly (ethylene imine) epichlorohydrin, such as #634, available from Scientific Polymer Products, poly (ethylene imine) ethoxylated, such as #636, available from Scientific Polymer Products, and the like, as well as mixtures thereof.

The crosslinking agent is present in the first coating in any effective amount. Typically, the crosslinking agent is present in an amount of from about 0.1 to about 10 percent by weight of the first coating, and preferably from about 0.5 to about 5.0 percent by weight of the first coating, although the amount can be outside these ranges.

Examples of suitable catalysts include p-toluene sulfonic acid (such as CYCAT4040, available from American Cyanamid Company), magnesium chloride (available from Aldrich Chemical Company), dimethylaminomethyl phenols (such as DMP-10, available from Rohm and Haas, Inc.), and the like, as well as mixtures thereof.

The catalyst is present in the first coating in any effective amount. Typically, the catalyst is present in an amount of from about 5 to about 75 percent by weight of the crosslinking agent, and preferably from about 10 to about 50 percent by weight of the crosslinking agent, although the amount can be outside of these ranges.

The polymeric material capable of being crosslinked by the crosslinking agent generally is selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof. Examples of polysaccharides having at least one hydroxy group include hydroxyalkyl celluloses, alkylhydroxyalkyl celluloses, hydroxyalkyl alkyl celluloses, hydroxyalkylhydroxyalkyl celluloses, hydroxyalkyl starches, and the like, wherein the alkyl group contains from 1 to about 4 carbon atoms, such as methyl, ethyl, propyl, or butyl, including hydroxyl ethyl starch, hydroxy propyl starch, hydroxyethyl cellulose, hydroxypropyl cellulose, hydroxypropylmethyl cellulose, cationic hydroxyethyl cellulose, carboxymethylhydroxypropyl guar, and the like. Examples of polysaccharides having at least one carboxy or sulfate group include cellulose sulfate, salts of cellulose sulfate, such as sodium cellulose sulfate, carboxyalkyl celluloses and salts of carboxyalkyl celluloses, wherein the alkyl group contains from 1 to about 4 carbon atoms, such as methyl, ethyl, propyl, or butyl, including carboxymethyl cellulose, sodium carboxymethyl cellulose, sodium carboxymethyl hydroxyethyl cellulose, carboxymethyl dextran, carboxymethyl hydroxypropyl guar, and the like. Examples of polysaccharides having at least one amine or amino group include diethyl amino ethyl cellulose, diethyl ammonium chloride hydroxyethyl cellulose, diethyl aminoethyl cellulose, diethyl aminoethyl dextran, amino dextran, dimethyl ammonium hydrolyzed collagen protein, and the like. Examples of polysaccharide gums include methyl cellulose, gum arabic, carrageenan gum, Karaya gum, Xanthan gum, chitosan, cationic guar, and the like.

Examples of poly (alkylene oxides) include poly (ethylene oxide), poly (propylene oxide), poly (ethylene oxide)-poly (propylene oxide) block copolymers, poly (1,4-oxybutylene) glycol, poly (alkylene glycol diacrylates), wherein alkyl is methyl, ethyl, propyl, or butyl, and the like.

Examples of vinyl polymers include poly (vinyl alcohol), poly (vinyl phosphate), poly (vinyl pyrrolidone), vinyl pyrrolidone-styrene copolymer, vinyl pyrrolidone-vinyl acetate copolymer, poly (vinyl amine), poly (vinyl alcohol) ethoxylated, poly (vinyl pyrrolidone-dimethylamino ethylmethacrylate), and the like.

Blends of two or more polymers capable of being crosslinked can also be employed.

The polymeric material capable of being crosslinked is present in any effective amount. Typically, the polymeric material is present in an amount of from about 5 to about 80 percent by weight of the first coating, and preferably from about 10 to about 50 percent by weight of the first coating, although the amount can be outside these ranges.

The first coating is of any effective thickness, typically from about 1 to about 25 microns, and preferably from about 5 to about 10 microns, although the thickness can be outside of these ranges. In many instances, particularly when the transparency is employed in a printing process employing an aqueous liquid ink, the first coating can absorb the liquid vehicle of the ink (typically comprising water and a humectant such as a glycol for ink jet inks, for example).

Specific examples of first coating layer (in contact with the base sheet) compositions suitable for recording sheets for printing processes employing aqueous based inks include hydrophilic materials, such as blends of 40 percent by weight of methyl cellulose (such as Methocel AM4, available from Dow Chemical Company) or hydroxypropyl starch (such as #02382, available from Poly Sciences Inc.) or hydroxyethyl starch (such as #06733, available from Poly Sciences Inc.) and 40 percent by weight of poly (ethylene oxide) (such as Poly OX-WSRN 3000, available from Union Carbide Company) and 10 percent by weight of poly (vinyl alcohol) (such as Elvanol, available from DuPont Chemical Company) and 10 percent by weight of hexamethoxymethylmelamine (such as Cymel 303, available from American Cyanamid Company) or a methylated melamine (such as Resimene 2040, available from Monsanto Chemical Company); blends of 40 percent by weight of hydroxypropyl cellulose (such as Klucel Type E, available from Hercules Chemical Company) or hydroxyethyl cellulose (such as Natrosol 250LR, available from Hercules Chemical Company) or ethylhydroxyethyl cellulose (such as Bermocoll, available from Berol Kem. A. B. Sweden) or hydroxypropylhydroxyethyl cellulose (obtained by hydroxypropylation of hydroxyethyl cellulose), and 40 percent by weight of poly (propylene oxide) (such as #816, #819, #823, available from Scientific Polymer Products), and 10 percent by weight poly (vinyl alcohol) ethoxylated (such as #6573, available from Poly Sciences Inc.), and 10 percent by weight partially methylated melamine-formaldehyde (such as Cymel 373, available from American Cyanamid Company); blends of 40 percent by weight hydroxypropyl cellulose (such as Klucel Type E, available from Hercules Chemical Company) or hydroxypropylmethyl cellulose (such as Methocel K35LV, available from Dow Chemical Company) or hydroxy ethylmethyl cellulose (such as HEMC, available from British Celanese Ltd., also available as Tylose MH and MHK from Kalle AG) or hydroxybutylmethyl cellulose (such as HBMC, available from Dow Chemical Company), and 40 percent by weight of poly (ethylene oxide) such as POLY OX-WSRN 3000, available from Union Carbide Company), and 10 percent by weight poly (vinyl alcohol) (such as Elvanol, available from DuPont Chemical Company), and 10 percent by weight of methylated urea-formaldehyde (such as Beetle 65, available from American Cyanamid Company); blends of 50 percent by weight (hydroxypropyltriethylammonium chloride hydroxyethyl cellulose (such as Polymer JR, available from Union Carbide Company), and 30 percent by weight poly (ethylene oxide)-poly (propylene oxide) block copolymer (such as Tetronic 50R8, 25R8, Pluronic F-77, available from BASF Corporation), and 10 percent by weight poly (vinyl amine) (such as #1562, available from Poly Sciences Inc.), and 10 percent by weight cationic urea-formaldehyde resin (such as Resin 917, available from Hercules Chemical Company); blends of 50 percent by weight diethylammoniumchloride hydroxyethyl cellulose (such as Celquat H-100, L-200, available from National Starch and Chemical Company), and 30 percent by weight poly (ethylene oxide)-poly (propylene oxide) block copolymer (such as Alkatronic EGE 25-2 and PGP 33-8, available from Alkaril Chemicals), and 10 percent by weight poly (vinyl phosphate) (such as #4391, available from Poly Sciences Inc.), and 9 percent by weight of glyoxal-urea resin (such as Nopcote 1670, from Henkel Corporation), and 1 percent by weight dimethylaminomethyl phenol (such as DMP-10, available from Rohm and Haas); blends of 50 percent by weight diethylaminoethyl cellulose (such as DEAE cellulose #05178, available from Poly Sciences Inc.), and 30 percent by weight poly (ethylene oxide)-poly (propylene oxide) block copolymer (such as Tetronic 908, 904, and 90R4, available from BASF Corporation), and 10 percent by weight poly (vinyl pyrrolidone) (such as K-90, available from GAF Corporation), and 10 percent by weight methylated urea-formaldehyde (such as Beetle 65, available from American Cyanamid Corporation) or butylated urea-formaldehyde (such as Resimene 920, available from Monsanto Chemical Company); blends of 60 percent by weight sodium carboxymethyl cellulose (such as CMC 7HOF, or CMC 7H3SX, available from Hercules Chemical Company) or sodium cellulose sulfate (such as #023, available from Scientific Polymer Products) or sodium carboxy methylhydroxyethyl cellulose (such as CMHEC 43H and 37L, available from Hercules Chemical Company) or methyl cellulose acrylate (such as #8633, available from Monomer-Polymer and Dajac Laboratories Inc.) or methyl cellulose crotonate (such as #8635, available from Monomer-Polymer and Dajac Laboratories Inc.), and 30 percent by weight poly (ethylene oxide) (such as POLY OX-WSRN 3000, available from Union Carbide Chemicals) or poly (ethylene glycol diacrylate) (such as SR344, available from Sartomer Company), and 5 percent by weight poly (vinyl alcohol) (such as Elvanol, available from DuPont Chemical Company) or vinyl pyrrolidone-vinyl acetate copolymer (such as #02587, available from Poly Sciences Inc.) or vinyl pyrrolidone-styrene copolymer (such as #371, available from Scientific Polymer Products) or poly (vinyl pyrrolidone-dimethylaminoethyl methacrylate) (such as #16294 and #16295, available from Poly Sciences Inc.), and 5 percent by weight cationic polyamide-epichlorohydrin (such as the Kymene resins available from Hercules Chemical Company) or an oxazolidine (such as Zoldine ZT55, available from Angus Chemical Company) or poly (aziridine) (such as Xama 7, available from Hoechst Celanese Company); blends of 60 percent by weight carboxymethyl dextran (such as #165058, available from Poly Sciences Inc.) or aminodextran (such as that available from Molecular Probes Inc.) or diethylaminoethyl dextran (such as #5178, available from Poly Sciences Inc.), and 30 percent by weight poly (propylene oxide) (such as #483, available from Scientific Polymer Products, Inc.), and 5 percent by weight poly (acrylamide) (such as #02806) or acrylamide-acrylic acid copolymer (such as #04652, #02220, and #18545, available from Poly Sciences Incorporated)) or poly (N,N-dimethylacrylamide) (such as #004590, available from Poly Sciences Incorporated), and 5 percent by weight poly (N,N-dimethyl-3,5 dimethylene piperidinium chloride) (such as #175, available from Scientific Polymer Products) or poly (2-acrylamido-2-methyl propane sulfonic acid) (such as #401, available from Scientific Polymer Products) or poly (methylene-guanidine) hydrochloride (such as #654, available from Scientific Polymer Products); blends of 60 percent by weight gum arabic (such as #G-9752, available from Sigma Chemical Company) or carrageenan gum (such as #C1013, available from Sigma Chemical Company) or karya gum (such as #G0503, available from Sigma Chemical Company) or xanthan gum (such as Keltrol-T, available from Kelco division of Merck and Company), and 30 percent by weight poly(ethylene oxide) (such as POLY OX-WSRN 3000, available from Union Carbide Company) or poly(ethylene oxide)-poly(propylene oxide) block copolymer (such as Tetronic 50R8, available from BASF corporation), and 5 percent by weight poly(vinyl alcohol) ethoxylated (such as #6573, available from Poly Sciences Inc.) or poly(vinyl amine) (such as #1562, available from Poly Sciences Inc.), and 5 percent by weight poly(ethylene imine) (such as #135, available from Scientific Polymer Products) or poly-(ethylene imine) epichlorohydrin (such as #634, available from Scientific Polymer Products) or poly(ethylene imine) ethoxylated (such as #636, available from Scientific Polymer Products); blends of 50 percent by weight chitosan (such as #C3646, available from Sigma Chemical Company) or carboxymethylhydroxypropyl guar (available from Aqualon Company) or cationic guar (such as Celanese Jaguars C-14-S, C-15, C-17, available from Celanese Chemical Company) or dimethyl ammoniumhydrolyzed collagen protein (such as Croquats, available from Croda Chemicals), and 30 percent by weight poly(ethylene oxide) (such as POLY OX WSRN 3000, available from Union Carbide Chemicals), and 10 percent by weight poly(vinyl alcohol) (such as Elvanol, available from DuPont Chemicals Company) or poly(vinyl pyrrolidone) (such as K-90, available from GAF Corporation), and 10 percent by weight cationic urea-formaldehyde (such as Poly Cup 917 resin, available from Hercules Chemical Company)

or glyoxal urea polymer resin (available as Nopcote 1661, 1670, from Henkel Corporation) or methylated urea-formaldehyde (such as Beetle 65, available from American Cyanamid Company) or methylated melamine-formaldehyde (such as Cymel 373, available from American Cyanamid Company); blends of 50 percent by weight sodium carboxymethylhydroxyethyl cellulose (CMHEC 43H or 37L, available from Hercules Chemical Company) or sodium carboxymethyl cellulose (CMC 7H3SX, available from Hercules Chemical Company), and 29.5 percent by weight poly(ethylene oxide) (such as POLY OX-WSRN 3000, available from Union Carbide Chemicals), and 10 percent by weight poly(vinyl alcohol) (such as 88 percent hydrolyzed Elavanol, from DuPont Chemicals), and 10.0 percent by weight glutaraldehyde (available from Aldrich Chemical Company), and 0.5 percent by weight magnesium chloride (Aldrich Chemical Company) or p-toluene sulfonic acid (such as CYCAT4040, available from American Cyanamid Company) or dimethylaminomethyl phenol (such as DMP-10, available from Rohm and Haas); blends of cellulosic polysaccharides with poly(ethylene oxide), poly(vinyl alcohol), or poly(vinyl alcohol) ethoxylated, and glyoxal-urea polymer resin, as well as crosslinked blends of cellulosic polysaccharides with poly(ethylene oxide), poly(vinyl alcohol), glutaraldehyde, magnesium chloride, or p-toluene sulfonic acid are preferred as first layer polymers, as these blends exhibit good glycol and water absorption capacity and images dry fast on these coatings.

The second layer contains a binder and an additive selected from the group consisting of fatty imidazolines, ethosulfate quaternary compounds, dialkyl dimethyl methosulfate quaternary compounds, alkoxylated difatty quaternary compounds, amine oxides, amine ethoxylates, Imidazoline quaternary compounds, alkyl benzyl dimethyl quaternary compounds, poly (epiamines), and mixtures thereof. The binder is selected to be compatible with the material from which images will be formed on the recording sheet. For example, when the recording sheet is intended for use in ink jet printing processes, the binder will be one that enables formation of high quality images with the ink used in the process, which typically is an aqueous based ink. When the recording sheet is intended for use in electrophotographic, ionographic, or electrographic printing processes, the binder will be one compatible with the toner employed to develop the images, which may be either a dry toner or a liquid toner, and which typically is hydrophobic.

Examples of suitable binders include alcohol soluble polymers, such as those polymers soluble in methanol, including polyacrylic acid, such as #598, #599, #600, #413, available from Scientific Polymer Products, poly (hydroxyalkyl methacrylates), wherein alkyl has from 1 to about 18 carbon atoms, including methyl, ethyl, propyl, butyl, hexadecyl, and the like, including poly(2-hydroxyethylmethacrylate), such as #414, #815, available from Scientific Polymer Products, and poly(hydroxypropylmethacrate), such as #232 available from Scientific Polymer Products, poly (hydroxyalkylacrylates), wherein alkyl is methyl, ethyl, or propyl, including poly(2-hydroxyethyl acrylate), such as #850, available from Scientific Polymer Products, and poly(hydroxypropyl acrylate), such as #851, available from Scientific Polymer Products, poly(vinyl butyral), such as #043, #511, #507, available from Scientific Polymer Products, alkyl cellulose or aryl cellulose, wherein alkyl is methyl, ethyl, propyl, or butyl and aryl is phenyl or the like, including ethyl cellulose such as Ethocel N-22, available from Hercules Chemical Company, poly (vinylacetate), such as #346, #347, available from Scientific Polymer Products, and the like; ketone soluble polymers, such as those polymers soluble in acetone, including hydroxyalkyl cellulose acrylates and hydroxyaryl cellulose acrylates, wherein alkyl is methyl, ethyl, propyl, or butyl and aryl is phenyl or the like, including hydroxyethyl cellulose acrylate, such as #8630, available from Monomer-Polymer and Dajac Laboratories Inc., hydroxyalkyl cellulose methacrylates and hydroxyaryl cellulose methacrylates, wherein alkyl is methyl, ethyl, propyl, or butyl and aryl is phenyl or the like, including hydroxyethyl cellulose methacrylate, such as #8631, available from Monomer-Polymer and Dajac Laboratories Inc., cellulose-acrylamide adducts, such as #8959, #8960, #8961, #8962, available from Monomer-Polymer and Dajac Laboratories, Inc., poly (vinyl butyral), such as #043, #511, #507, available from Scientific Polymer Products, cyanoethylated cellulose, such as #091, available from Scientific Polymer Products, cellulose acetate hydrogen phthalate, such as #085, available from Scientific Polymer Products, hydroxypropylmethyl cellulose phthalate, such as HPMCP, available from Shin-Etsu Chemical, cellulose triacetate, such as #031, available from Scientific Polymer Products, poly-(α-methylstyrene), such as #309, available from Scientific Polymer Products, styrene-butadiene copolymers, such as Kraton G-1652, Kraton DX-1150, and Kraton elastomer (such as D1107, G-1657, G-1657/FG1901, D-1101, FG1901, available from Shell Corporation), styrene-butylmethacrylate copolymers, such as #595, available from Scientific Polymer Products, vinyl chloridevinylacetate-vinyl alcohol terpolymers, such as #428, available from Scientific Polymer Products, chlorinated solvent soluble polymers, such as poly (p-phenylene ether-sulfone) (such as #392, available from Scientific Polymer Products), polysulfones, such as #046, available from Scientific Polymer Products, aromatic ester carbonate copolymers, such as APE KLI-9306, APE KLI-9310, available from Dow Chemical Company, poly carbonates, such as #035, available from Scientific Polymer Products, α-methylstyrene-dimethylsiloxane block copolymers, such as PS 0965, available from Petrarch Systems, dimethyl siloxane-bisphenol A carbonate block copolymers, such as PSO99, available from Petrarch Systems, poly(2,6-dimethyl p-phenylene oxide), such as #126, available from Scientific Polymer Products, poly (2,4,6-tribromostyrene), such as #166, available from Scientific Polymer Products, and the like.

Further examples of binders compatible with aqueous based inks are disclosed in, for example, U.S. Pat. Nos. 4,528,242, 4,547,405, 4,555,437, 4,575,465, 4,578,285, 4,592,954, 4,649,064, 4,781,985, 4,887,097, 4,474,850, 4,650,714, 4,732,786, 4,775,594, 4,308,542, 4,269,891, 4,371,582, 4,301,195, 4,503,111, 4,686,118, 4,701,837, 4,770,934, 4,466,174, 4,371,582, 4,680,235, 4,711,816, and U.S. Pat. No. 4,830,911, the disclosures of each of which are totally incorporated herein by reference.

Further examples of binders compatible with dry and liquid toners are disclosed in, for example, U.S. Pat. Nos. 3,320,089, 3,488,189, 3,493,412, 3,535,112, 3,539,340, 3,539,341, 3,619,279, 3,833,293, 3,841,903, 3,854,942, 4,071,362, 4,085,245, 4,234,644, 4,259,422, 4,370,379, 4,419,004, 4,419,005, 4,480,003, 4,489,122, 4,526,847, and U.S. Pat. No. 4,599,293, the disclosures of each of which are totally incorporated herein by reference.

The binder is present in any effective amount. Typically, the binder is present in an amount of from about 10 to about 90 percent by weight of the second coating, and preferably in an amount of from about 30 to about 70 percent by weight of the second coating, although the amount can be outside these ranges.

The second coating layer also contains a material selected from the group consisting of fatty imidazolines, ethosulfate quaternary compounds, dialkyl dimethyl methosulfate quaternary compounds, alkoxylated difatty quaternary compounds, amine oxides, amine ethoxylates, imidazoline quaternary compounds, alkyl benzyl dimethyl quaternary compounds, poly (epiamines), and mixtures thereof. This material is present in the coating in any effective amount. Typically, this material is present in an amount of from about 10 to about 90 percent by weight of the second coating, and preferably in an amount of from about 30 to about 70 percent by weight of the second coating, although the amount can be outside of these ranges.

Examples of fatty imidazolines include oleic imidazolines, such as Arzoline-215, available from Baker Chemicals, fatty hydroxyethyl imidazolines, such as cocohydroxyl ethyl imidazoline, available as Alkazine-C from Alkaril Chemicals, oleyl hydroxy ethyl imidazoline, available as Alkazine-O from Alkaril Chemicals, tallow hydroxyethyl imidazoline, available as Alkazine-TO from Alkaril Chemicals, and the like. Examples of ethosulfate quaternary compounds include Cordex AT-172, available from Finetex Corporation, Finquat CT, available from Finetex Corporation, and the like. Examples of dialkyl dimethyl methosulfate quaternary compounds include dihydrogenated tallow dimethyl ammonium methosulfate, available as Alkaquat DHTS from Alkaril Chemicals, and the like. Examples of alkoxylated di-fatty quaternary compounds include complex alkoxylated ditallow quaternary methosulfate, available as Alkaquat DAET from Alkaril Chemicals, Alkaquat DAPT from Alkaril Chemicals, and the like. Examples of amine oxides include cocoamido propyl dimethyl amine oxide, such as Alkamox CAPO, available from Alkaril Chemicals, oleyl dimethyl amine oxide, such as Alkamox ODM, available from Alkaril Chemicals, lauryl dimethyl amine oxide, such as Alkamox L20, available from Alkaril Chemicals, Alkamox L, available from Alkaril Chemicals, and the like. Examples of amine ethoxylates include tallow ethoxylated amines, such as tallow amine containing 2 moles, 5 moles, 15 moles, 30 moles, or 50 moles of ethoxylate, available respectively as Alkaminox T-2, Alkaminox T-5, Alkaminox T-15, Alkaminox T-30, and Alkaminox T-50 from Alkaril Chemicals, soya amine ethoxylates, such as SO-5, available from Alkaril Chemicals, and the like. Examples of imidazoline quaternary compounds include oleyl, tallow, and stearyl imidazoline quaternaries, available as Alkaquats O, T and S from Alkaril Chemicals, and the like. Examples of alkyl benzyl dimethyl quaternary compounds include those with from about 10 to about 18 alkyl carbon atoms, including stearyl benzyl dimethyl ammonium chloride, available as Alkaquat DMB-ST from Alkaril Chemicals, blends of 40% by weight lauryl benzyl dimethyl ammonium chloride, 50% by weight myristyl benzyl dimethyl ammonium chloride, and 10% by weight hexadecyl benzyl dimethyl ammonium chloride, available as Alkaquat DMB-451 from Alkaril Chemicals and as Barquat MB-50 from Lonza, Inc., myristyl benzyl dimethyl ammonium chloride, available as Arquad DMMC B-50, DM14B-90 from Akzo Chemicals Inc., lauryl benzyl dimethyl ammonium chloride, available as Retarder N from Hart Chemicals Ltd., and the like. Examples of poly (epiamines) include dimethyl amine/epichlorohydrin copolymers, available as Agefloc A50LV, B50LV, A50, A50HV, B-4506, B4508, B-50 from CPS Chemical Co., Inc., and the like.

The second coating can be of any effective thickness. Typical thicknesses are from about 1 to about 25 microns, and preferably from about 5 to about 15 microns, although the thickness can be outside of these ranges. In addition, the second coating can optionally contain filler materials, such as inorganic oxides, including silicon dioxide, titanium dioxide (rutile, available from NL Chem Canada Inc.), and the like, colloidal silicas, such as Syloid™ 74 available from W.R. Grace & Company, calcium carbonate (such as Microwhite available from Sylacauga Calcium Products), calcium silicate (available from J.M. Huber Corporation), or the like, as well as mixtures thereof, in any effective amount. Typical amounts of fillers are from about 1 to about 25 percent by weight of the coating composition, and preferably from about 2 to about 10 percent by weight of the coating composition, although the amount can be outside of these ranges. When it is desired that the recording sheet of the present invention be transparent, the filler typically is present in the coating composition an amount of up to about 3 percent by weight.

Specific examples of the second coating layer materials suitable for recording sheets for printing processes employing aqueous or dry inks include materials which are soluble in alcohol (such as methanol) include blends of 50 percent by weight poly acrylic acid (such as #598, #599, #600, #413, available from Scientific Polymer Products) or poly(hydroxypropylmethacrate) (such as #232, available from Scientific Polymer Products) or poly(2-hydroxyethylmethacrylate) (such as #414, #815, available from Scientific Polymer Products), and 50 percent by weight of an ethosulfate quaternary compound (such as Cordex AT-172 and Finquat CT, available from Finetex Corporation) or an alkyl benzyl dimethyl quaternary compound (such as Alkaquats DMB-ST and DMB-451, available from Alkaril Chemicals) or a dialkyl dimethyl methosulfate quaternary compound (such as Alkaquat DHTS, available from Alkaril Chemicals) or an alkoxylated difatty quaternary compound (such as Alkaquat DAET and Alkaquat DAPT, available from Alkaril Chemicals); blends of 50 percent by weight poly(2-hydroxyethyl acrylate) (such as #850, available from Scientific Polymer Products) or poly(hydroxypropyl acrylate) (#851, available from Scientific Polymer Products), and 50 percent by weight of a fatty imidazoline (such as Arzoline 215, available from Baker Chemicals) or a fatty hydroxyethyl imidazoline (such as Alkazine-C (coconut Alkazine), Alkazine-O (oleic Alkazine), or Alkazine-TO (tail oil Alkazine), available from Alkaril Chemicals) or an imidazoline quaternary compound (such as Alkaquats O, T, and ST, available from Alkaril Chemicals); blends of 50 percent by weight poly(vinyl acetate) (such as #346, #347, available from Scientific Polymer Products) or poly(vinyl butyral) (such as #043, # #507, available from Scientific Polymer Products), and 50 percent by weight of an ethoxylated amine (such as Alkaminox T-2, T-5, T-15, T-30, T-50, available from Alkaril Chemicals) or an amine oxide (such as Alkamox ODM, Alkamox L20, Alkamox L, Alkamox CAPO, available from Alkaril Chemicals); blends of 50 percent by weight ethyl cellulose (such as Ethocel N-22, available from Hercules Chemical Company), and 50 percent by weight of poly(epiamine) (such as Agefloc A50LV, available from CPS Chemical Co., Inc.).

Specific examples of the second coating layer materials for recording sheets for printing processes employing aqueous or dry inks include materials which are soluble in ketones (such as acetone), including blends of 50 percent by weight of a cellulose-acrylamide adduct (such as #8959, #8960, #8961, #8962, available from Monomer-Polymer and Dajac Laboratories, Inc.) or hydroxyethyl cellulose acrylate (such as #8630, available from Monomer-Polymer and Dajac Laboratories Inc.) or hydroxyethyl cellulose methacrylate (such as #8631, available from Monomer-Polymer and Dajac Laboratories Inc.) or poly (vinyl butyral), such as #043, #511, #507, available from Scientific Polymer Products or cyanoethylated cellulose, such as #091, available from Scientific Polymer Products or cellulose acetate hydrogen phthalate, such as #085, available from Scientific Polymer Products or hydroxypropylmethyl cellulose phthalate, such as HPMCP, available from Shin-Etsu Chemical or cellulose triacetate, such as #031, available from Scientific Polymer Products or poly (α-methylstyrene), such as #309, available from Scientific Polymer Products or styrene-butadiene copolymers, such as Kraton G-1652, Kraton DX-1150, and Kraton elastomers, such as D1107, G-1657, G-1657/FG1901, D-1101, FG1901, available from Shell Corporation or styrene-butylmethacrylate copolymers, such as #595, available from Scientific Polymer Products or vinyl chloride-vinylacetate-vinyl alcohol terpolymers, such as #428, available from Scientific Polymer Products, and 50 percent by weight of Alkazine-O (available from Alkaril Chemicals) or an alkosulfate quaternary compound (such as Cordex AT-172, available from Finetex Corporation) or a poly(epiamine) (such as Agefloc, available from CPS Chemical Company, Inc.) or an amine oxide (such as Alkamox CAPO) or an ethoxylated amine (such as Alkaminox T-5, available from Alkaril Chemicals). Also suitable are blends of 50 percent by weight of poly (p-phenylene ether-sulfone), such as #392, available from Scientific Polymer Products or polysulfone, such as #046, available from Scientific Polymer Products or aromatic ester carbonate copolymers, such as APE KLI-9306, APE KLI-9310, available from Dow Chemical Company or poly carbonate, such as #035, available from Scientific Polymer Products or α-methylstyrene-dimethylsiloxane block copolymers, such as PS 0965, available from Petrarch Systems or dimethyl siloxane-bisphenol A carbonate block copolymers, such as PSO99, available from Petrarch Systems or poly (2,6-dimethyl p-phenylene oxide), such as #126, available from Scientific Polymer Products or poly (2,4,6-tribromostyrene), such as #166, available from Scientific Polymer Products, and 50 percent by weight of Alkazine-O, available from Alkaril Chemicals or Cordex AT-172, available from Finetex Corporation of Alkaminox T-5, available from Alkaril Chemicals or Alkamox CAPO, available from Alkaril Chemicals; blends of fatty imidazolines, such as Alkazine-O and Arzoline-215 or ethoxylated amines, such as Alkaminox T-5, with binders such as poly(acrylic acid), cellulose-acrylamide adducts, and poly(vinyl butyral) are preferred as second layer coating materials for ink jet printing as well as for xerography, as these coatings yield images of high optical density, such as 1.35 (black), 1.08 (magenta), 0.98 (cyan) and 0.56 (yellow) in some embodiments with a Xerox ® 4020 ink jet printer and optical densities of 1.35 (black) with a Xerox ® 1038 imaging apparatus, which images could not be lifted off with 3M Scotch ® tape 60 seconds subsequent to their preparation. Further examples of coating materials compatible with dry and liquid toners are disclosed in for example, U.S. Pat. Nos. 3,320,089, 3,488,189, 3,493,412, 3,535,112, 3,539,340, 3,539,341, 3,619,279, 3,833,293, 3,841,903, 3,854,942, 4,071,362, 4,085,245, 4,234,644, 4,259,422, 4,370,379, 4,419,004, 4,419,005, 4,480,003, 4,489,122, 4,526,847, and U.S. Pat. No. 4,599,293, the disclosures of each of which are totally incorporated herein by reference.

The recording sheets of the present invention can be prepared by any suitable method. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 25° to about 100° C. in an air drier.

Recording sheets of the present invention can be employed in ink jet printing processes. One embodiment of the present invention is directed to a process which comprises applying an aqueous recording liquid to a recording sheet of the present invention in an imagewise pattern. Another embodiment of the present invention is directed to a printing process which comprises (1) incorporating into an ink jet printing apparatus containing an aqueous ink a recording sheet of the present invention, and (2) causing droplets of the ink to be ejected in an imagewise pattern onto the recording sheet, thereby generating images on the recording sheet. Ink jet printing processes are well known, and are described in, for example, U.S. Pat. Nos. 4,601,777, 4,251,824, 4,410,899, 4,412,224, and 4,532,530, the disclosures of each of which are totally incorporated herein by reference.

Recording sheets of the present invention can be employed in printing and copying processes wherein dry or liquid electrophotographic-type developers are employed, such as electrophotographic processes, ionographic processes, or the like. Yet another embodiment of the present invention is directed to a process for generating images which comprises generating an electrostatic latent image on an imaging member in an imaging apparatus; developing the latent image with a toner; transferring the developed image to a recording sheet of the present invention; and optionally permanently affixing the transferred image to the recording sheet. Still another embodiment of the present invention is directed to an imaging process which comprises generating an electrostatic latent image on a recording sheet of the present invention; developing the latent image with a toner; and optionally permanently affixing the developed image to the recording sheet. Electrophotographic processes are well known, as described in, for example, U.S. Pat. No. 2,297,691 to Chester Carlson. Ionographic and electrographic processes are also well known, and are described in, for example, U.S. Pat. Nos. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, and 4,155,093, the disclosures of each of which are totally incorporated herein by reference.

The recording sheets of the present invention can be used in any other printing or imaging process, such as printing with pen plotters, handwriting with ink pens (either aqueous or nonaqueous based inks), offset printing processes, or the like, provided that the ink employed to form the image is compatible with the material selected as the ink receiving layer of the recording sheet.

The recording sheets of the present invention exhibit little or no blocking. Blocking refers to the transfer of ink or toner from a printed image from one sheet to another when recording sheets are stacked together. The recording sheets of the present invention exhibit substantially no blocking under, for example, environmental conditions of from about 20 to about 80 percent relative humidity and at temperatures of about 50° C.

Further, the recording sheets of the present invention exhibit high resistance to humidity. Resistance to humidity generally is the capacity of a recording sheet to control the blooming and bleeding of printed images, wherein blooming represents intra-diffusion of dyes and bleeding represents inter-diffusion of dyes. The blooming test can be performed by printing a bold filled letter such as "T" on a recording sheet and placing the sheet in a constant environment chamber preset for humidity and temperature. The vertical and horizontal spread of the dye in the letter "T" is monitored periodically under a microscope. Resistance to humidity limit is established when the dyes selected begin to diffuse out of the letter "T". The bleeding test is performed by printing a checker board square pattern of various different colors and measuring the inter-diffusion of colors as a function of humidity and temperature.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Twenty transparent recording sheets were prepared by a solvent extrusion process (single side each time initially) on a Faustel Coater by providing a Mylar™ base sheet (roll form) with a thickness of 100 microns and coating the base sheet with a polyblend consisting of 60 percent by weight sodium carboxymethyl cellulose (CMC 7H3SX, obtained from Hercules Chemical Company), 30 percent by weight poly(ethylene oxide) (POLY OX-WSRN 3000, obtained from Union Carbide Chemicals), 5 percent by weight poly(vinyl alcohol) (Elvanol, obtained from Dupont Chemical Company), 5 percent by weight of cationic polyamide-epichlorohydrin (Kymene resin obtained from Hercules Chemical Company), which can complex with sodium carboxymethylcellulose and physically crosslink it. The polyblend was present in a concentration of 4 percent by weight in water. Subsequent to air drying at 100° C. for a period of 20 minutes and monitoring the difference in weight prior to and subsequent to coating, the dried Mylar® roll was coated on one side with a polymer layer that can absorb the ink-vehicle such as glycol and water, with the coating present in an amount such that when the roll was cut into twenty 8.5×11 inch sheets, each sheet was coated on one side with 0.7 grams, 7 microns in thickness of the polymer layer. This dried, glycol and water absorbing first layer was then overcoated on the Faustel Coater with a second image receiving coating comprising a blend of 50 percent by weight of poly(vinyl butyral) (#507 obtained from Scientific Polymer Products) and 50 percent by weight of fatty imidazoline (Alkazine-O, obtained from Alkaril Chemical Company), which blend was present in a concentration of 2 percent by weight in methanol. Subsequent to air drying at 100° C. for a period of 10 minutes and monitoring the difference in weight prior to and subsequent to coating, the glycol and water absorbing layer of each subsequently cut 8.5×11 inch sheet was overcoated with 0.2 grams, 2 microns in thickness of the dye retaining layer. Rewinding the coated side of the Mylar® on an empty core and using this roll, the uncoated back side of the Mylar® was coated first with the glycol and water absorbing first coating materials and then overcoated with the image receiving second coating materials used on the front side by the same process. The roll was then cut into 20 8.5×11 inch sheets. These recording sheets were then fed individually into a Xerox® 4020 ink jet color printer containing four separate inks (commercially available and obtained from Sharp Inc. as inks for the Xerox® 4020) which each comprised water, glycols, and a black, magenta, cyan, or yellow dye, respectively. Images were obtained on the image receiving layers with average optical density values of ten of the sheets measured at 1.25 (black), 1.10 (magenta), 0.95 (cyan), and 0.57 (yellow). These imaged transparency sheets were placed in a heat and humidity controlled environment chamber preset at 80° F. and 80 percent relative humidity. The ink jet images under such conditions were resistant to humidity for more than a week in that they exhibited no blooming during this time. The other ten imaged sheets were kept in plastic sleeves composed of polypropylene and poly(vinyl chloride) for a period of six months, during which time they exhibited no blooming.

EXAMPLE II

Twenty transparent recording sheets were prepared by a solvent extrusion process (single side each time initially) on a Faustel Coater by providing a Mylar® base sheet (roll form) with a thickness of 100 microns and coating the base sheet with a polyblend consisting of 59 percent by weight sodium carboxymethyl hydroxyethyl cellulose (CMHEC 43H obtained from Hercules Chemical Company), 29.5 percent by weight poly(ethylene oxide) (POLY OX-WSRN 3000 obtained from Union Carbide Chemicals), 10 percent by weight poly(vinyl alcohol) (88 percent hydrolyzed, Elvanol obtained from Dupont Chemicals), 1.0 percent by weight glutaraldehde (Aldrich Chemical Company), and 0.5 percent by weight magnesium chloride (Aldrich Chemical Company). The polyblend was present in a concentration of 5 percent by weight in water. Subsequent to air drying at 100° C. for a period of 20 minutes and monitoring the difference in weight prior to and subsequent to coating, the dried Mylar® roll was coated on one side with a first coating layer capable of absorbing an ink vehicle typically employed in ink jet inks, such as a mixture of glycol and water, in an amount such that when the roll was cut into twenty 8.5×11 inch sheets, each sheet was coated on one side with 0.65 grams, 6.5 microns in thickness, of the polymer layer. This dried glycol and water absorbing first coating layer was then overcoated on the Faustel Coater with a second image receiving layer comprising a blend of 50 percent by weight cellulose-acrylamide adduct (#8961 obtained from Monomer-Polymer and DAJAC Laboratories Inc.) and 50 percent by weight alkosulfate quaternary (Cordex AT-172 obtained from Finetex Corp.), which blend was present in a concentration of 2 percent by weight in acetone. Subsequent to air drying at 100° C. for a period of 10 minutes and monitoring the difference in weight prior to and subsequent to coating, the glycol and water absorbing first coating layer of each subsequently cut sheet was overcoated with 0.2 grams, 2 microns in thickness Rewinding the coated side of the Mylar® on an empty core and using this roll, the uncoated back side of the Mylar® was coated first with the glycol and water absorbing first coating layer materials and then overcoated with the second image receiving coating layer materials used on the front side by the same process. These recording sheets were then fed individually into a Xerox® 4020 ink jet printer. Images were obtained with average optical density values for the twenty sheets of 1.18 (black), 1.15 (magenta), 0.90 (cyan), and 0.60 (yellow). These imaged transparencies were placed in a heat and humidity controlled environment chamber preset at 80° F. and 80 percent relative humidity. The ink jet images under these conditions were resistant to humidity for a period of more than a week in that they exhibited no blooming during this time.

EXAMPLE III

Twenty transparent recording sheets were prepared by a dip coating process (both sides coated in one operation) by providing Mylar® base sheets in cut sheet form (8.5×11.0 inches) in a thickness of 100 microns and coating the base sheets with a polyblend consisting of 40 percent by weight hydroxyethyl cellulose (Natrosol 250LR obtained from Hercules Chemical Company), 40 percent by weight poly(propylene oxide) (#823 obtained from Scientific Polymer Products), 10 percent by weight poly(vinyl alcohol) ethoxylated (#6573 obtained from Poly Sciences Inc), and 10 percent by weight partially methylated melamine-formaldehyde (Cymel 373 obtained from American Cyanamid Company). The polyblend was present in a concentration of 4 percent by weight in water. Subsequent to air drying at 100° C. for a period of 10 minutes and monitoring the difference in weight prior to and subsequent to coating, the dried Mylar® sheets were each coated with 0.7 grams, 7 microns in thickness (each side) of a polyblend that can absorb an ink vehicle such as glycol and water. These dried glycol and water absorbing first coating layers were then overcoated via a dip coating process (coating both sides of the recording sheet) with a blend consisting of 75 percent by weight ethyl cellulose (Ethocel N-22 obtained from Hercules Chemical Company) and 25 percent by weight poly(epiamine) (Agefloc A50LV obtained from CPS Chemical Company), which blend was present in a concentration of 2 percent by weight in a mixture of 75 percent by weight ethanol and 25 percent by weight toluene. Subsequent to air drying, the two layered two sided coated transparency sheets at 100° C. and monitoring the difference in weight prior and subsequent to coating, the glycol and water absorbing first coating layer on each side of each sheet was overcoated with 0.25 grams, 2.5 microns in thickness of the second image receiving coating layer. These sheets were then fed individually into a Xerox® 1038 black-only imaging apparatus and images were obtained with an average optical density value of 1.35 (black). These images could not be lifted off with a 3M Scotch® tape 60 seconds subsequent to their preparation.

EXAMPLE IV

Twenty transparent recording sheets were prepared by a dip coating process (both sides coated in one operation) by providing Mylar® base sheet in cut sheet form (8.5×11.0 inches) in a thickness of 100 microns and coating the base sheets with a polyblend consisting of 60 percent by weight xanthan gum (Keltrol-T obtained from Kelco division of Merck and Company), 30 percent by weight poly(ethylene oxide)-poly(propylene oxide) copolymer (Tetronic 50R8 obtained from BASF Corporation), 5 percent by weight poly(vinyl amine) (#1562 obtained from Poly Sciences Inc), and 5 percent by weight poly(ethylene imine) ethoxylated (crosslinking agent, #636 obtained from Scientific Polymer Products). The polyblend was present in a concentration of 4 percent by weight in water. Subsequent to air drying at 100° C. for a period of 10 minutes and monitoring the weight prior to and subsequent to coating, the dried Mylar® sheets were each coated with 0.8 grams, 8 microns in thickness (each side) of a polyblend that can absorb ink vehicles such as glycol and water. These dried polyblend first coating layers were then overcoated with a blend comprising 50 percent by weight poly(hydroxypropyl methacrylate) (#232 obtained from Scientific Polymer Products) and 50 percent by weight ethoxylated amine (Alkaminox-T5, obtained from Alkaril Chemical Company), which blend was present in a concentration of 2 percent by weight in methanol. Subsequent to air drying, the two layered two-sided coated transparency sheets at 100° C. and monitoring the difference in weight prior to and subsequent to coating, the glycol and water absorbing first coating layer on each side of each sheet was overcoated with 0.2 grams, 2.5 microns in thickness of the image receiving second coating layer. These sheets were then fed individually into a Xerox® 1005 color imaging apparatus and images were obtained with optical density values of 1.5 (black), 1.4 (magenta), 1.4 (cyan), and 0.8 (yellow). These images could not be lifted off with 3M Scotch® tape 60 seconds subsequent to their preparation.

EXAMPLE V

Twenty transparent recording sheets were prepared by a dip coating process (both sides coated in one operation) by providing Mylar® base sheet in cut sheet form (8.5×11.0 inches) in a thickness of 100 microns and coating the base sheet with a polyblend consisting of 50 percent by weight carboxymethyl hydroxypropyl guar (obtained from Aqualon Company), 30 percent by weight poly(ethylene oxide), (POLY OX-WSRN 3000 obtained from Union Carbide Chemicals), 10 percent by weight poly(vinyl pyrrolidone) (K-90, obtained from GAF Corporation), and 10 percent by weight glyoxal-urea polymer resin (Nopcote 1670 obtained from Henkel Corporation). The polyblend was present in a concentration of 4 percent by weight in water. Subsequent to air drying at 100° C. for a period of 10 minutes and monitoring the weight prior to and subsequent to coating, the dried Mylar® sheets were coated with 0.7 grams, 7 microns in thickness (each side) of the polyblend. These dry polyblend coated Mylar sheets were then overcoated with a blend comprising 50 percent by weight poly(acrylic acid) (#600 obtained from Scientific Polymer Products) and 50 percent by weight of dialkyl dimethyl methosulfate quaternary compound (Alkaquat DHTS, obtained from Alkaril Chemical Company), which blend was present in a concentration of 2 percent by weight in methanol. Subsequent to air drying the two layered two-sided coated transparency sheets at 100° C. and monitoring the difference in weight prior to and subsequent to coating, each side of each sheet of the Mylar® previously coated with the ink vehicle absorbing polyblend first coating layer was overcoated with 0.2 grams, 2 microns in thickness of the image receiving second coating layer. These sheets were then fed individually into a Xerox® 4020 color ink jet printer and images were obtained with optical density values of 1.20 (black), 1.05 (magenta), 0.90 (cyan), and 0.55 (yellow). Ten of these imaged transparency sheets were placed in a heat and humidity controlled environment chamber present at 80° F. and 80 percent relative humidity. The ink jet images under such conditions were resistant to humidity for more than a week in that they exhibited no blooming during this time. The ten other imaged transparency sheets were kept in plastic sleeves composed of poly(vinyl chloride) and poly propylene for a period of six months, during which time they exhibited no blooming.

Other embodiments and modifications of the present invention may occur to those skilled in the art subsequent to a review of the information presented herein; these embodiments and modifications, as well as equivalents thereof, are also included within the scope of this invention.

What is claimed is:

1. A recording sheet which comprises a substrate; a first coating in contact with the substrate which comprises a crosslinking agent selected from the group consisting of: (a) hexamethoxymethyl melamine, (b) methylated melamine-formaldehyde, (c) methylated urea-formaldehyde, (d) cationic urea-formaldehyde, (e) cationic polyamine-epichlorohydrin, (f) glyoxal-urea resin, (g) poly (aziridine), (h) poly (acrylamide), (i) poly (N,N-dimethyl acrylamide), (j) acrylamide-acrylic acid copolymer, (k) poly (2-acrylamido-2-methyl propane sulfonic acid), (l) poly (N,N-dimethyl-3,5-dimethylene piperidinium chloride), (m) poly (methyleneguanidine) hydrochloride, (n) poly (ethylene imine), (o) poly (ethylene imine) epichlorohydrin, (p) poly (ethylene imine) ethoxylated, (q) glutaraldehyde, and mixtures thereof; a catalyst; and a polymeric material capable of being crosslinked by the crosslinking agent and selected from the group consisting of: (a) polysaccharides having at least one hydroxy group, (b) polysaccharides having at least one carboxy group, (c) polysaccharides having at least one sulfate group, (d) polysaccharides having at least one amine or amino group, (e) polysaccharide gums, (f) vinyl polymers, (g) poly (alkylene oxides), and mixtures thereof; and a second coating in contact with the first coating which comprises a binder and a material selected from the group consisting of: (a) fatty imidazolines, (b) ethosulfate quaternary compounds, (c) dialkyl dimethyl methosulfate quaternary compounds, (d) alkoxylated di-fatty quaternary compounds, (e) amine oxides, (f) amine ethoxylates, (g) Imidazoline quaternary compounds, (h) alkyl benzyl dimethyl quaternary compounds, (i) poly (epiamines), and mixtures thereof.

2. A recording sheet according to claim 1 wherein the first coating has a thickness of from about 1 to about 25 microns.

3. A recording sheet according to claim 1 wherein the second coating has a thickness of from about 1 to about 25 microns.

4. A recording sheet according to claim 1 wherein the crosslinking agent is present in the first coating in an amount of from about 0.1 to about 10 percent by weight.

5. A recording sheet according to claim 1 wherein the polymeric material capable of being crosslinked is selected from the group consisting of (1) hydroxyethyl starch, (2) hydroxypropyl starch, (3) methyl cellulose, (4) hydroxyethyl cellulose, (5) hydroxypropyl cellulose, (6) hydroxyethylmethyl cellulose, (7) hydroxypropylmethyl cellulose, (8) hydroxybutylmethyl cellulose, (9) ethylhydroxyethyl cellulose, (10) hydroxypropylhydroxyethyl cellulose, (11) sodium cellulose sulfate, (12) sodiumcarboxymethyl hydroxyethyl cellulose, (13) diethylammoniumchloride hydroxyethyl cellulose, (14) hydroxypropyl trimethyl ammoniumchloride hydroxyethyl cellulose, (15) diethyl aminoethyl cellulose, (16) carboxymethyldextran, (17) diethyl aminoethyl dextran, (18) aminodextran, (19) sodium carboxymethyl cellulose, (20) gum arabic, (21) carrageenan gum, (22) karaya gum, (23) xanthan gum, (24) chitosan, (25) carboxymethyl hydroxypropyl guar, (26) cationic guar, (27) dimethyl ammonium hydrolyzed collagen protein, (28) poly (ethylene oxide), (29) poly (propylene oxide), (30) poly (ethylene oxide)-poly (propylene oxide) block copolymers, (31) poly (1,4-oxybutylene) glycol, (32) poly (alkylene glycol diacrylates) where alkyl is methyl, ethyl, propyl and butyl, (33) poly (vinyl alcohol), (34) poly (vinyl phosphate), (35) poly (vinyl pyrrolidone), (36) vinyl pyrrolidone-styrene copolymers, (37) vinyl pyrrolidone-vinylacetate copolymers, (38) poly (vinyl amine), (39) poly (vinyl alcohol) ethoxylated, (40) poly (vinyl pyrrolidone-dimethylamino ethylmethacrylate), and mixtures thereof.

6. A recording sheet according to claim 1 wherein the polymeric material capable of being crosslinked is present in the first coating in an amount of from about 5 to about 80 percent by weight.

7. A recording sheet according to claim 1 wherein the catalyst is selected from the group consisting of (1) p-toluene sulfonic acid, (2) dimethylaminomethyl phenol, (3) magnesium chloride, and mixtures thereof.

8. A recording sheet according to claim 1 wherein the catalyst is present in an amount of from about 5 to about 75 percent by weight of the crosslinking agent.

9. A recording sheet according to claim 1 wherein the binder is selected from the group consisting of (1) cellulose-acrylamide adduct, (2) poly (vinyl butyral), (3) poly (vinyl acetate), (4) ethylcellulose, (5) poly (acrylic acid), (6) poly (hydroxypropylmethacrylate), (7) poly (2-hydroxyethyl acrylate), (8) poly (hydroxypropyl acrylate), (9) hydroxyethyl cellulose acrylate, (10) hydroxyethyl cellulose methacrylate, (11) poly (p-phenylene ether-sulfone), (12) poly sulfone, (13) poly carbonate, (14) aromatic ester carbonate copolymers, (15) cyanoethylated cellulose, (16) cellulose acetate hydrogen phthalate, (17) hydroxypropyl methyl cellulose phthalate, (18) cellulose triacetate, (19) poly (α-methylstyrene), (20) α-methylstyrenedimethyl siloxane block copolymer, (21) dimethyl siloxane-bis phenol A carbonate block copolymers, (22) poly (2,6-dimethyl p-phenylene oxide), (23) vinyl alcohol-vinyl acetate copolymers, (24) vinyl alcohol-vinyl butyral copolymers, (25) poly (2,4,6-tribromo styrene), (26) blends of ethylene-maleic anhydride with vinyl alcohol-vinyl acetate polymers, (27) blends of ethylene-maleic anhydride with vinylalcohol-vinyl butyral copolymers, (28) styrene-butadiene copolymers, (29) styrene-butylmethacrylate copolymers, (30) vinylchloride-vinylacetate-vinyl alcohol terpolymers, and mixtures thereof.

10. A recording sheet according to claim 1 wherein the binder is present in the second coating in an amount of from about 10 to about 90 percent by weight.

11. A recording sheet according to claim 1 wherein the second coating contains a material selected from the group consisting of cocohydroxyethyl imidazoline, oleyl hydroxyethyl imidazoline, tall oil hydroxyethyl imidazoline, dihydrogenated tallow dimethyl ammonium methosulfate, complex alkoxylated ditallow quaternary methosulfate, coco amidopropyl dimethyl amine oxide, lauryl dimethyl amine oxide, tallow ethoxylated amines, soya amine ethoxylate, oleyl imidazoline quaternary, tallow imidazoline quaternary, stearyl imidazoline quaternary, lauryl benzyl dimethyl ammonium chloride, myristyl benzyl dimethyl ammonium chloride, hexadecyl benzyl dimethyl ammonium chloride, stearyl benzyl dimethyl ammonium chloride, dimethyl amine-epichlorohydrin copolymers, ethosulfate quaternary compounds, and mixtures thereof.

12. A recording sheet according to claim 1 wherein the total amount of fatty imidazoline, ethosulfate quaternary compound, dialkyl dimethyl methosulfate quaternary compound, alkoxylated di-fatty quaternary compound, amine oxide, amine ethoxylate, Imidazoline quaternary compound, alkyl benzyl dimethyl quaternary compound, and poly (epiamine) in the second coating is from about 10 to about 90 percent by weight.

13. A recording sheet according to claim 1 wherein the second coating contains a filler material.

14. A recording sheet according to claim 13 wherein the filler material is selected from the group consisting of silicon dioxide, titanium dioxide, colloidal silica, calcium carbonate, calcium silicate, and mixtures thereof.

15. A recording sheet according to claim 13 wherein the filler material is present in the second coating in an amount of from about 1 to about 25 percent by weight.

16. A recording sheet according to claim 1 wherein the substrate is substantially transparent.

17. A recording sheet according to claim 1 wherein the substrate is of a material selected from the group consisting of polyesters, polycarbonates, polysulfones, polyether sulfones, poly (arylene sulfones), poly (arylene ether ketone sulfones), cellulose triacetate, polyvinylchloride cellophane, polyvinyl fluoride, polyimides, and mixtures thereof.

18. A process which comprises applying an aqueous recording liquid to a recording sheet in an imagewise pattern to a recording sheet which comprises a substrate; a first coating in contact with the substrate which comprises a crosslinking agent selected from the group consisting of: (a) hexamethoxymethyl melamine, (b) methylated melamine-formaldehyde, (c) methylated urea-formaldehyde, (d) cationic urea-formaldehyde, (e) cationic polyamine-epichlorohydrin, (f) glyoxal-urea resin, (g) poly (aziridine), (h) poly (acrylamide), (i) poly (N,N-dimethyl acrylamide), (j) acrylamide-acrylic acid copolymer, (k) poly (2-acrylamido-2-methyl propane sulfonic acid), (l) poly (N,N-dimethyl-3,5-dimethylene piperidinium chloride), (m) poly (methylene-guanidine) hydrochloride, (n) poly (ethylene imine), (o) poly (ethylene imine) epichlorohydrin, (p) poly (ethylene imine) ethoxylated, (q) glutaraldehyde, and mixtures thereof; a catalyst; and a polymeric material capable of being crosslinked by the crosslinking agent and selected from the group consisting of: (a) polysaccharides having at least one hydroxy group, (b) polysaccharides having at least one carboxy group, (c) polysaccharides having at least one sulfate group, (d) polysaccharides having at least one amine or amino group, (e) polysaccharide gums, (f) vinyl polymers, (g) poly (alkylene oxides), and mixtures thereof; and a second coating in contact with the first coating which comprises a binder and a material selected from the group consisting of: (a) fatty imidazolines, (b) ethosulfate quaternary compounds, (c) dialkyl dimethyl methosulfate quaternary compounds, (d) alkoxylated di-fatty quaternary compounds, (e) amine oxides, (f) amine ethoxylates, (g) Imidazoline quaternary compounds, (h) alkyl benzyl dimethyl quaternary compounds, (i) poly (epiamines), and mixtures thereof.

* * * * *